United States Patent
Gray

(10) Patent No.: US 10,282,352 B2
(45) Date of Patent: May 7, 2019

(54) COMPUTING SYSTEMS AND PROCESSES FOR IMPROVED DATABASE JUNCTION RELATIONSHIPS

(71) Applicant: salesforce.com, inc., San Francisco, CA (US)

(72) Inventor: William Victor Gray, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 172 days.

(21) Appl. No.: 15/145,436

(22) Filed: May 3, 2016

(65) Prior Publication Data
US 2017/0322965 A1   Nov. 9, 2017

(51) Int. Cl.
| | | |
|---|---|---|
| *G06F 17/30* | (2006.01) | |
| *G06Q 10/10* | (2012.01) | |
| *H04L 12/58* | (2006.01) | |
| *H04L 29/06* | (2006.01) | |
| *G06F 16/23* | (2019.01) | |
| *G06F 16/21* | (2019.01) | |

(52) U.S. Cl.
CPC .............. *G06F 16/23* (2019.01); *G06F 16/21* (2019.01); *G06Q 10/109* (2013.01); *H04L 51/28* (2013.01); *H04L 67/42* (2013.01)

(58) Field of Classification Search
CPC ......... G06F 17/30345; G06F 17/30289; H04L 51/28; H04L 67/42
USPC ......................................................... 707/609
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |

(Continued)

*Primary Examiner* — Pierre M Vital
*Assistant Examiner* — Alicia M Antoine
(74) *Attorney, Agent, or Firm* — Lorenz & Kopf, LLP

(57) ABSTRACT

Database clients submit junction data (such as invitees to a meeting or other event) at the same time that a new database entity is created. Junction data may be represented within a string array or other data structure that can be delivered using a SOAP, REST or similar protocol for delivering data to the computing server platform. By submitting junction data within the same structure that is used to create the new entity, the likelihood of phantom data or other corruption in the database is greatly reduced.

20 Claims, 2 Drawing Sheets

(56) References Cited

U.S. PATENT DOCUMENTS

Figure 1:
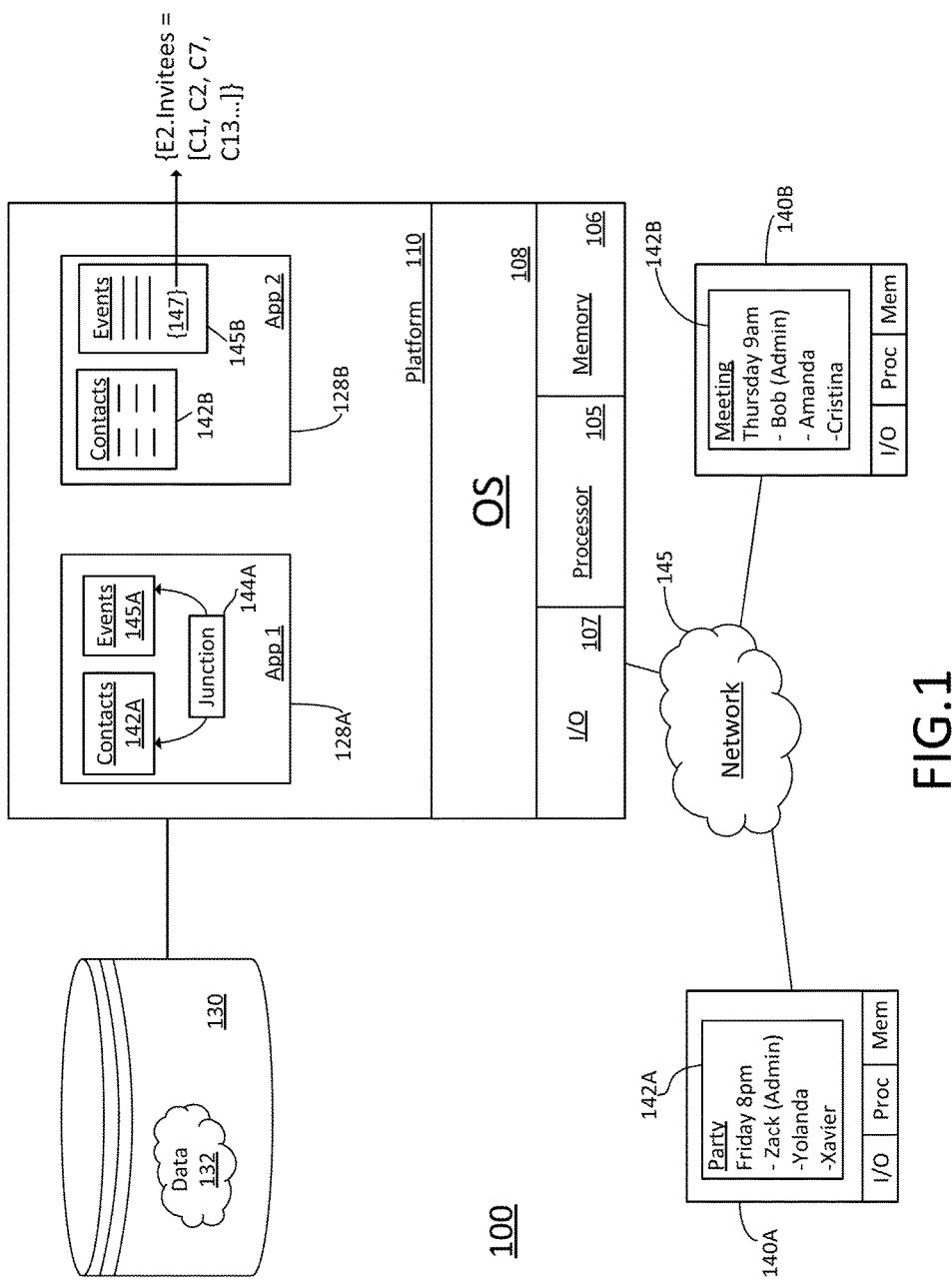

| | | |
|---|---|---|
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2016/0134583 A1* | 5/2016 | Kumar .................. H04L 51/36 709/206 |
| 2016/0358126 A1* | 12/2016 | Bostick .............. G06Q 10/1095 |
| 2017/0250969 A1* | 8/2017 | O'Brien ............ G06F 17/30619 |
| 2017/0310716 A1* | 10/2017 | Lopez Venegas .......................... G06Q 10/1093 |

* cited by examiner

COMPUTING SYSTEMS AND PROCESSES FOR IMPROVED DATABASE JUNCTION RELATIONSHIPS

TECHNICAL FIELD

This document relates to data processing by a computer, especially database or file management for more efficient processing of data within a computer system. More particularly, this document relates to processes and systems to reduce data corruption and to improve computing efficiency, thereby improving database junction relationship processing by a computer system.

BACKGROUND

Modern database and software application development is evolving away from the client-server model toward "cloud"-based processing systems that provide access to data and services via networks such as the Internet. In contrast to prior systems that hosted networked applications on dedicated server hardware, the cloud computing model allows applications to be provided over the network "as a service" supplied by an infrastructure provider.

Although cloud computing platforms can provide substantial benefits to developers and users, certain technical challenges can arise in designing, building and operating database applications based upon such platforms. Database tables that include many-to-many relationships, for example, can pose particular technical challenges in large-scale databases for several reasons. If a user is attempting to create an application that tracks people invited to a meeting or other event, for example, every "event" entry in the database would typically require multiple links to different "invitee" records. That is, any number of events would be linked to any number of invitees, thereby leading to complicated and potentially inter-woven data relationships.

Traditional database management systems often handle many-to-many data relationships by creating "junction tables" to manage the different relationships. These junction tables are effectively separate lists that maintain keys or other data to track the various relationships between the primary tables. Conventional junction tables, however, exhibit several marked disadvantages. At the very least, the junction tables are additional data structures that require processing every time any of the many-to-many resources are modified, thereby requiring substantial computing resources. Moreover, in modern database environments based upon SOAP/REST or similar serial application program interface (API) constructs, client interactions with junction tables can create multiple API calls, thereby increasing computing overhead and presenting additional opportunities for data corruption. To continue the meeting invitee example, creating a new meeting with invitees would require first creating a new event entity to obtain a newly-generated key identifying the new event. The client would then submit the newly-generated key to the appropriate junction records to establish many-to-many relationships between the new event and some number of invitees. In a serialized API such as SOAP or REST, each of these steps would generally require a separate interaction between the client the server. This multi-step process creates the opportunity for data corruption if the first call to obtain the key is successful but ensuing calls to establish junction relationships are unsuccessful.

It is therefore desirable to create processes and systems that can more efficiently process many-to-many relationships without the technical problems currently being experienced in conventional database management systems. It would be further beneficial to streamline database management for serialized interfaces, especially those used in conjunction with multi-tenant or other cloud-based database management systems.

BRIEF DESCRIPTION

According to various example embodiments, database clients submit table junction data (such as invitees to a meeting or other event) at the same time that a new database table entry is created. Junction data may be represented within a string array or other data structure, for example, that can be delivered using a SOAP, REST or similar protocol for delivering data from the database client to the computing server platform. By submitting junction data within the same structure that is used to create the new entity, the likelihood of phantom data generation or other data corruption is greatly reduced.

Various embodiments relate to a process executed by a computer system that interacts with a database. The computer system may be, for example, a multi-tenant or other cloud based database management system executing on any number of processors having access to memories, mass storage, input/output interfaces and other computing hardware resources. In this example, the computer system executes a process that suitably comprises: storing, by the computer system, a contact list as a first data structure in the database; storing, by the computer system, an event list as a second data structure separate from the first data structure in the database; receiving, by the computer system, a request to add a new event to the event list, wherein the request is received via a data network from a remote client device, wherein the request comprises a list of contacts corresponding to contacts maintained in the first data structure that are associated with the new event; and, in response to the request, the computer system sending both a first message to the database to obtain a key for the new event and a second message that includes the key obtained in response to the first message and the list of contacts received in the request to thereby associate the list of contacts with the new event.

Other embodiments relate to a computer-implemented process executable by a computer system that manages a database. The process suitably comprises: receiving, by the computer system from a client device, an electronic request to create a new entry for a first table in the database, wherein the electronic request received from the client device comprises digital identifiers for at least one entry in a second table in the database that is separate from the first table; and, in response to receiving the request from the client device, the computer system automatically initiating both a first message to the database to create the new entry in the first database table and a second message to associate the newly-created entry in the first database table with the digital identifiers for the at least one entry in the second database table.

Still other embodiments relate to a server system that manages a database. The computer system suitably comprises an interface to a network and a processor. The processor is configured to receive an electronic request to create a new entry for a first table in the database from a client device, wherein the electronic request received from the client device comprises digital identifiers for at least one entry in a second table in the database that is separate from the first table; and, in response to receiving the request from the client device, to initiate both a first message to the database to create the new entry in the first database table and a second message to associate the newly-created entry in the first database table with the digital identifiers for the at least one entry in the second database table. In some embodiments, both the computing platform sends both the first and second messages without further input from the client device, thereby reducing the likelihood of phantom data. Various embodiments may implement the server system with a cloud-based computing platform having any number of processors, memories, interfaces and/or the like.

DESCRIPTION OF THE DRAWING FIGURES

Figure 2:
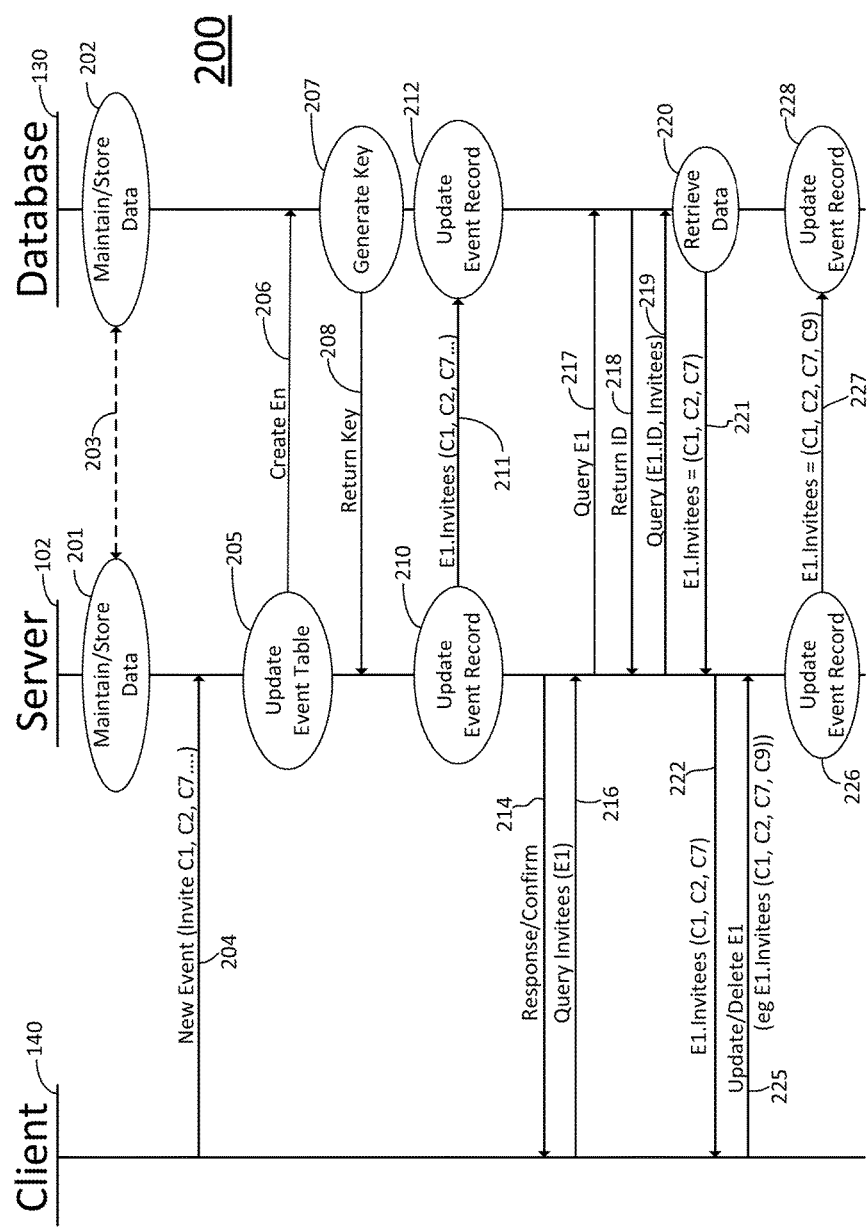

Example embodiments will hereinafter be described in conjunction with the following drawing figures, wherein like numerals denote like elements, and FIG. 1 is a block diagram of one example of a data processing system that supports improved database junction interfaces; and FIG. 2 is a flow diagram showing an example of a computerized process to efficiently process database junction interfaces.

DETAILED DESCRIPTION

According to various embodiments, systems and processes are provided to greatly streamline the processing of many-to-many database relationships by representing junction relationship data within the newly-created entity itself rather than in a separate junction table. To that end, various embodiments receive junction relationships from the client via a flattened array of ID values represented as a string or similar construct. This array is processed by the computing platform to associate junction data with the newly-created database entity. By receiving a new data field within the entity creation message, create/insert/update operations can be processed within a single call from the client to the database server, thereby greatly improving transactional integrity while simplifying the protocol design and hiding the complexity of the junction table from the user.

The general concepts and systems described herein may be applied in any number of different computing settings to support any number of different data types, processing environments and/or presentation systems. FIG. 1 presents one example of database development implemented within the context of a multi-tenant computing system. Other embodiments could be developed to execute in any other collaborative computing environment, including any sort of server based, peer-to-peer or other networked environment in which multiple client applications process data obtained from a shared server or other resource.

Turning now to FIG. 1, an example of a multi-tenant application system 100 suitably includes a server 102 operating a platform no that dynamically creates virtual applications 128A-B based upon data 132 from a common database 130 that is shared between multiple tenants. Data and services generated by the virtual applications 128A-B are provided via network 145 to any number of client devices 140A-B, as desired.

Platform no allows users to create and run data-driven applications 128A-B of all sorts. The examples presented herein often reference a scheduling application that links events to persons attending the event for clarity and consistency. Equivalent embodiments could implement the same (or similar) concepts, however, in any number of different applications that make use of many-to-many relationships.

In the examples presented in FIG. 1, a more conventional database application 128A is shown with a junction table 144A that links data relationships between two data tables: a contact table 142A and an event table 145A. Contact table 142A suitably maintains contact information for people, and an event table 145A suitably maintains information about meetings, social gatherings or other events that people might attend. To that end, junction table 144A typically includes pairings of events from event table 145A and attendees from contact table 145A. Such a table 144A may appear as a series of paired keys representing the different database attendees. One example junction table 144A could be formatted as: {(E1, C1), (E2, C2), (E3, C2), (E3, C5), . . . } or the like, with each contact ("C") attending each event ("E") having its own separate entry. One issue with this structure is that it maintains a relatively large amount of data. If ten people are each attending five different events, for example, a junction table 144A formatted in this manner will have fifty different entries. Whenever an entry is updated, the table 144A typically needs to be de-normalized or otherwise processed, thereby creating an undesirable amount of programming overhead. Other embodiments could be formatted in other ways, but similar challenges would nevertheless occur.

Handling of remote client applications 142 executing on remote client devices 140A-B can present additional challenges. Typically, a client application 142A-B interacts with the server platform no via an application program interface (API) based upon protocols such as Simple Object Access Protocol (SOAP), REpresentational State Transfer (REST) and/or the like. These protocols make use of serial messaging, often formatted in accordance with Hypertext Transport Protocol (HTTP) or the like for convenient transport over the Internet or similar networks.

Typically, the client 142 would place a first API call to the platform no to create a new entity (e.g., a new event in event table 145A). This first call would typically return a unique key that identifies the newly-created entity. Client application 142 would then place a second call to the platform 110 providing the newly-received key to populate the information in the new event, including a list of invitees. In practice, data corruption can occur if the first call from the client application 142 (creating the new event) is successful but the second call (providing the junction data) is not successful. In this case, a "phantom" entity with no data can be created in event table 145A. This situation seems to occur more frequently when the client device 140 is a mobile device such as a phone or tablet, possibly due to the unreliable nature of wireless networks.

Database application 128B provides an API with more robust and efficient junction data handling. In this example, client application 142 submits new events to the platform no by including a new data field 147 representing the junction data in the new event request. To that end, event invitees, attendees and/or other contacts can be received in an array or similar list-type data structure 147, with data formatted as a text string or similar construct. In FIG. 1, for example, new events 145 are received by the API with a new data field 147 "E2.Invitees" that contains a list of contact IDs (e.g., "{C1, C2, C7, C13, . . . }" or the like, with each "Cx" representing an identifier of a different contact in list 142B. Because the platform no receives the junction data in the same message that creates the event, the platform 110 is able to create the new event record (including junction relationships to invitees or other contacts) without further interaction with the client. This substantially reduces the likelihood of phantom data, thereby leading to improved performance and less data corruption. The platform no is then able to process the received data by creating new events, updating tables 145, or performing other actions with database 130 as appropriate. In further examples, new event records could be submitted with additional or alternate data structures 147 to represent other lists of contacts, such as "attendees", "absentees", "administrators", "remote attendees", "in-person attendees", and/or the like.

To create a new event in application 128B, then, the client application 142B suitably provides a SOAP, REST or similar call to the API executing within application platform 110. The call placed to the API suitably includes a request for a new event that additionally provides the invitee, attendee and/or other contact information within an appropriate field 147. The platform receives the information and processes any backend interactions with database 130 to create a new event identifier/key and to populate the event record with appropriate data. These actions by the platform no may be abstracted from the client application 142 in the sense that the platform 110 handles new record creation and population of the new record without further interaction with the client 140, thereby greatly reducing the risk of phantom data being created. To that end, a new "event" request submitted by client 140 may include an additional data structure 147 that provides a list of contact identifiers corresponding to event invitees, attendees or others, as appropriate. Contact identifiers are submitted by client application 142 within data structure 147 as part of the newly-created entity itself. Interactions between the computing platform no and database 130 may proceed normally, including creation of junction tables or other structures as needed to efficiently store and retrieve data in database 130. Additional details about processes to create, query and update entities having internally-stored junction data are presented below with respect to FIG. 2.

Once again, the examples herein have focused primarily upon many-to-many relationships between event and contact tables; other embodiments could store and process junction information relating to any other types of data in an equivalent manner.

In the example illustrated in FIG. 1, virtual applications 128A-B may be generated at run-time using a common platform no that securely provides access to data 132 in database 130 for each of the various tenants subscribing to system 100. Each application 128A-B can include routines and processes for receiving data, processing the data, and reporting data to one or more users.

Database 130 is any sort of repository or other data storage system capable of storing and managing data 132 associated with one or more tenants. Database 130 may be implemented using any type of conventional database server hardware. In various embodiments, database 130 shares processing hardware 104 with server 102. In other embodiments, database 130 is implemented using separate physical and/or virtual database server hardware that communicates with server 102 to perform the various functions described herein.

Data 132 may be organized and formatted in any manner to support application platform 110. In various embodiments, data 132 is suitably organized into a relatively small number of large data tables to maintain a semi-amorphous "heap"-type format. Data 132 can then be organized as needed for a particular virtual application 128A-B. In various embodiments, conventional data relationships are established using any number of pivot tables or other structures that establish indexing, uniqueness, relationships between entities, and/or other aspects of conventional database organization as desired.

Further data manipulation and report formatting is generally performed at run-time using a variety of meta-data constructs. Metadata within a universal data directory (UDD), for example, can be used to describe any number of forms, reports, workflows, user access privileges, business logic and other constructs that are common to multiple users of database 132. Tenant-specific formatting, functions and other constructs may be maintained as tenant-specific metadata for each tenant, as desired. Rather than forcing data 132 into an inflexible global structure that is common to all tenants and applications, then, database 130 is organized to be relatively amorphous, with tables and metadata providing additional structure on an as-needed basis. To that end, application platform no suitably uses tables and/or metadata to generate "virtual" components of applications 128A-B that logically obtain, process, and present the relatively amorphous data 132 from database 130. Such tables and metadata may be used to define one or more tables 142 and 145, as appropriate.

Server 102 is implemented using one or more actual and/or virtual computing systems that collectively provide a dynamic application platform no for generating virtual applications 128A-B. Server 102 operates with any sort of conventional computing hardware 104, such as any processor 105, memory 106, input/output features 107 and the like. Processor 105 may be implemented using one or more of microprocessors, microcontrollers, processing cores and/or other computing resources spread across any number of distributed or integrated systems, including any number of "cloud-based" or other virtual systems. Memory 106 represents any non-transitory short or long term storage capable of storing programming instructions for execution on processor 105, including any sort of random access memory (RAM), read only memory (ROM), flash memory, magnetic or optical mass storage, and/or the like. Input/output features 107 represent conventional interfaces to networks (e.g., to network 145, or any other local area, wide area or other network), mass storage, display devices, data entry devices and/or the like. In a typical embodiment, application platform no gains access to processing resources, communications interfaces and other features of hardware 104 using any sort of conventional or proprietary operating system 108. As noted above, server 102 may be implemented using a cluster of actual and/or virtual servers operating in conjunction with each other, typically in association with conventional network communications, cluster management, load balancing and other features as appropriate.

Application platform no is any software application or other data processing engine that generates virtual applications 128A-B that provide data and/or services to client devices 140A-B. Virtual applications 128A-B are typically generated at run-time in response to queries received from client devices 140A-B, as described more fully below. To that end, platform 110 dynamically builds and executes displays and other aspects of virtual applications 128A-B in response to specific requests received from client devices 140A-B. Virtual applications 128A-B are typically constructed in accordance with tenant-specific metadata, which describes the particular tables, reports/dashboards, interfaces and/or other features of the particular application. In various embodiments, each virtual application 128A-B generates dynamic web content that can be served to a browser or other client program 142A-B associated with client device 140A-B, as appropriate. Applications 128 may contain JAVA, .NET, HTML5 and/or other content that can be presented using conventional client software running on client device 140; other embodiments may simply provide dynamic web or other content that can be presented and viewed by the user, as desired.

Data and services provided by server 102 can be retrieved using any sort of personal computer, mobile telephone, tablet or other network-enabled client device 140 on network 145. Typically, the user operates client program 142 to contact server 102 via network 145. Client program 142 may operate within a conventional web browser, in some embodiments, while other embodiments may be more freestanding applications based upon a separate API as desired. Client application 142 communicates with server 102 using, for example, the hypertext transport protocol (HTTP) or the like. Some embodiments may use HTTP and/or other communications based upon the TCP/IP protocol stack, although other embodiments may use other types of protocols (e.g., voice or other telephony protocols, military protocols, secure or proprietary protocols and/or the like) as appropriate. As noted above, many implementations may make further use of SOAP, REST or similar APIs to facilitate transfer of database data, as desired.

In operation, then, developers use application platform no to create data-driven virtual applications 128A-B for the tenants that they support. Such applications 128A-B may make use of interface features such as tenant-specific screens, universal screens and/or the like. Any number of tenant-specific and/or universal objects may also be available for integration into reports, dashboards and/or other output displays of tenant-developed applications 128A-B. Data 132 associated with each application 128A-B is provided to database 130, as appropriate, and stored until requested, along with metadata that describes the particular features (e.g., reports, tables, functions, etc.) of tenant-specific application 128A-B until needed.

Data and services provided by server 102 can be retrieved using any personal computers, mobile telephones, tablets or other network-enabled client devices 140A-B on data network 145. Typically, the user operates a conventional browser or other client program to contact server 102 via network 145 using, for example, the hypertext transport protocol (HTTP) or the like. In some implementations, HTTP "get" and "put" statements may be transmitted over a transmission control protocol (TCP) session or the like to pass various messages, instructions and data relating to the display and design of interface objects, as described more fully below. In many implementations, Javascript, ActiveX, .NET, HTML5 and/or other logic executing within the browser of client device 140 generates interface features to be displayed in response to instructions received from the server 102; equivalent embodiments may use any sort of application program interface (API), application or other feature executing on client computing devices 140 to render graphical imagery to the display.

FIG. 2 is a data flow diagram showing various functions and interactions between a client application 142 executing on a client device 140, a server 102 and a database 130. As shown in FIG. 2, an example process 200 that makes use of embedded junction data 147 allows more streamlined communication between client 140 and server 102, thereby reducing the chance of data corruption.

As shown in FIG. 2, server 102 and database 130 suitably interact 203 to store and maintain data 132 in an organized manner. Typically, applications 128 executing on platform 110 of server 102 direct the actions taken by database 130 to store and update data 132, as appropriate (function 201). Database system 130 typically includes database management software (executing on any number of processors or other computing hardware) that processes the storage and updating of data 132 on magnetic, solid state, optical or other mass storage available to database 130. As noted above, data 132 may be organized in any manner.

When a client application 142 executing on a client device 140 wants to create a new database entity (e.g., a new event), the application 142 sends a "new entity" message 204 that includes any parameters and other information associated with the new entity. In various embodiments, a user enters the new information using a web-type or other interface presented by client device 140. When the information is entered, the user submits the new entity to the server 204, as appropriate. Application 142 then formats a new entity message 204 in accordance with SOAP, REST or other protocols that are capable of representing data to populate the various data fields in the newly-created entity. For a new "event" entity, for example, message 204 may include user-entered or user-selected data describing the event date and time, location, purpose, any invitees, administrators and/or the like. Invitees or other contacts may be described using database keys if this information is available to the client 140; otherwise contact names or other identifying information may be included in the message 204 for subsequent resolution by server 102 and/or database 130.

In response to the newly-received instruction 204, the application 128 suitably interacts with database 130 to create the new entity. In this example, server 102 creates a new "event" entity by requesting a new key identifier for a new event entity that can be added to a table of event records 145 (function 205). The server 102 therefore directs the database 130 to create a new key associated with the new entity (function 206). The database 130 creates the new key (function 207) and returns the newly-generated key to the server 102 (function 208) as directed.

Rather than forwarding the newly-generated key to the client 140 at this point for further processing, the server 102 uses the key to create a second instruction 211 for the database 130. This second instruction 211 includes the invitee list and/or other information that populates the data fields of the newly-created entity (function 210). The server 102 is therefore able to send two separate instructions to the database 130 without further interaction with the client 140: a first instruction 206 to create a key identifier for the new entity, and a second instruction 211 to populate the newly-identified entity with information obtained from client 140. These two instructions 206 and 211 are typically sent via a relatively secure and fast data connection (e.g., a private data connection or even a local area network), so the likelihood of losing one message (and thereby creating phantom or corrupt data) is much lower than the likelihood of losing messages sent over the Internet or a wireless network. By shifting the junction data into the newly-created entity record itself, the need for the client to interact with separate tables in database 130 is reduced, thereby reducing the chances of corruption or data loss.

Successful (and/or unsuccessful) creation of the new entity record may be confirmed by the server 102 sending a response 214 to the client 140, as appropriate. In some embodiments, the key identifier associated with the newly-generated entity is reported to the client 140 via the response 214. Other embodiments may send identifying information as part of reports, tables, responses to subsequent queries, and/or in any other manner.

To query the data in a record, the client 140 suitably requests the data associated with a particular event (function 216). The request 216 may include the key identifier associated with the queried event if the key is known.

If the key is not known to the client, than query 216 will include other information (e.g., event name, date and time, or the like) sufficient for the server 102 to identify the requested data and to obtain the key on its own. In such cases, the server 102 appropriately posits an SQL or similar query 217 to database 130 to receive one or more keys 218 that are associated with records matching the query. If multiple records match the query, then the results may be forwarded to the client 140 so the user can select the desired record from the query results.

When the key to the appropriate database entity is known to the server 102, then server 102 posits a SQL or similar query 219 to the database requesting some or all of the data stored with that entity. The database 130 processes the query (function 220) to obtain and format the requested data, which is then returned to the server 102 via message 221. The server 102 then forwards the requested data to the client application 142 executing on the client device 140 as appropriate (function 222).

To update or delete an entity record, the client application 142 suitably sends an update or delete instruction 222 to the server via the network connection. To add an invitee to an event, for example, the client application 142 might first posit a query 216 to the server 102 to identify the current invitees, and then provide a graphical or other interface to the user for making additions, deletions or other changes to the invitee list. The changes are formatted by the client application 142 as an instruction 225 (e.g., using SOAP, REST or other constructs) and submitted to the server 102 for further processing. This update instruction may include an array or other structure that represents contacts or other junction data in a manner similar to that described above. Server 102 receives the instruction 225 and updates the database record associated with the entity (function 226) by formatting an SQL or similar instruction 227 that is sent to database 130 to update the record as appropriate (function 228). Typically, data fields are updated by simply replacing the previous data. Updating a list of invitees to an event, for example, may involve replacing the previous data with data received from the newly-formatted structure containing the current data. The success (and/or failure) of the update may be confirmed by sending reporting messages back to the server 102 (function 230) and/or the client 140 (function 232) as desired.

Other embodiments may supplement and/or modify the basic functions and messages shown in FIG. 2 in any manner. Generally speaking, the various functions and features of process 200 may be carried out with any sort of hardware, software and/or firmware logic that is stored and/or executed on any platform. Some or all of process 200 may be carried out, for example, by logic executing within system 100 in FIG. 1. Other portions of process 200 may be performed by client devices 140A-B, as shown in the figure. To that end, the various functions shown in FIG. 2 may be implemented using software or firmware logic that is stored in memory 106 and executed by processor 105 as part of application platform 110, or using software or firmware logic stored in memory or mass storage of client devices 140A-B and executed by processors operating within client devices 140A-B, as appropriate. The particular hardware, software and/or firmware logic that implements any of the functions shown in FIG. 2 may vary from context to context, implementation to implementation, and embodiment to embodiment in accordance with the various features, structures and environments set forth herein. The particular means used to implement each of the various functions shown in FIG. 2, then, could be any processing structures that are capable of executing software and/or firmware logic in any format, and/or any application-specific or general purpose hardware, including any discrete and/or integrated circuitry.

The term "exemplary" is used herein to represent one example, instance or illustration that may have any number of alternates. Any implementation described herein as "exemplary" should not necessarily be construed as preferred or advantageous over other implementations, but rather as a non-limiting example.

Although several embodiments have been presented in the foregoing description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents. To that end, the concepts set forth herein have been primarily described within the context of generating dashboard interfaces for a multi-tenant cloud computing platform. Equivalent embodiments, however, could be readily applied to other programming environments, platforms and/or the like.

What is claimed is:

1. A process executed by a computer system that interacts with a database, the computer system having a processor and a memory, the process comprising:
   storing, by the computer system, a contact list as a first data structure in the database;
   storing, by the computer system, an event list as a second data structure separate from the first data structure in the database;
   receiving, by the computer system, a request to add a new event to the event list, wherein the request is received via a data network from a remote client device, wherein the request comprises a list of contacts corresponding to contacts maintained in the first data structure that are associated with the new event;
   in response to the request received from the client device, the computer system initially sending a first message to the database to obtain a key for the new event and, in response to the computer system receiving the key for the new event from the database, automatically initiating a second message to the database that includes both the key obtained in response to the first message and the list of contacts received in the request from the client device to thereby associate the list of contacts with the new event in the database; and
   in response to a subsequent response from the database confirming that the list of contacts has been added to the event, the computer system transmitting a response to the client device via the data network.

2. The process of claim 1, further comprising the computer system updating the list of contacts for one of the events in the list of events to thereby add an additional contact from the contact list in response to a subsequent request received via the data network from the remote client device.

3. The process of claim 1 wherein the updating comprises replacing a prior version of the list of contacts with a new version of the list of contacts that includes the additional contact from the contact list.

4. The process of claim 1 wherein the first and second data structures are database tables.

5. The process of claim 1 wherein the list of contacts is received from the remote client device as a serialized list.

6. The process of claim 5 wherein the serialized list is an array of text strings.

7. The process of claim 6 wherein each of the text strings represents an identifier of one of the contacts in the contacts list.

8. The process of claim 7 wherein the text strings are associated with the second data structure.

9. The process of claim 8 wherein the computer system identifies contacts associated with the new event from the identifiers represented in the text strings of the array.

10. The process of claim 8 wherein each of the identifiers represented in the text string of the array received from the remote client device identifies an invitee to the new event.

11. The process of claim 1 wherein the first and second messages are both sent from the computer system to the database without further intervening communication with the client device so that the newly-created entity is created in the database in response to a single communication from the client device via the data network.

12. A non-transitory computer-implemented process executable by a computer system that manages a database, the process comprising:
receiving, by the computer system from a client device, an electronic request to create a new entry to be listed in a first table in the database, wherein the electronic request received from the client device comprises digital identifiers for at least one entry in a second table in the database that is separate from the first table; and
in response to receiving the request from the client device, the computer system automatically initiating a first message to the database to create the new entry in the first database table and to receive a digital key identifying the new entry in the first database table;
in response to the computer system receiving the digital key identifying the new entry in the first database table, the computer system automatically initiating a second message to the database that comprises both the digital identifiers received from the client device and the digital key received in response to the first message to thereby instruct the database to associate the newly-created entry in the first database table with the digital identifiers for the at least one entry in the second database table; and
transmitting, by the computer system, a single confirmation to the client device after receiving confirmation from the database that the first and second messages were successful.

13. The non-transitory computer-implemented process of claim 12 wherein the first table is a table of events and the second table is a table of contacts.

14. The non-transitory computer-implemented process of claim 13 wherein the electronic request received from the client device is a request for a new event that comprises a list of contacts corresponding to event invitees.

15. The non-transitory computer-implemented process of claim 14 wherein the list is a string array.

16. The non-transitory computer-implemented process of claim 15 wherein the first and second messages are both sent from the computer system to the database without further communication with the client device so that the newly-created entry is created in response to a single electronic request from the client device.

17. The non-transitory computer-implemented process of claim 15 wherein the client request is received by the computer system via a serialized application program interface that receives the digital identifiers in a predetermined format within a first HTTP message, and wherein the single confirmation is transmitted from the computer system to the client device via the serialized application program interface within a second HTTP message.

18. The non-transitory computer-implemented process of claim 17 wherein the serialized application program interface is one of a Simple Object Access Protocol (SOAP) and Representational State Transfer (REST) interface.

19. A computer system that manages a database, the computer system comprising:
an interface to a network; and
a processor configured to:
receive an electronic request to create a new entry to be listed in a first table in the database, wherein the electronic request received from the client device comprises digital identifiers for at least one entry in a second table in the database that is separate from the first table; and
in response to receiving the request from the client device, to initiate both a first message to the database to create the new entry in the first database table and to receive a digital key identifying the new entry in the first database table; and
in response to the computer system receiving the digital key identifying the new entry in the first database table, the computer system automatically initiating a second message to the database that comprises both the digital identifiers received from the client device and the digital key received in response to the first message to thereby instruct the database to associate the newly-created entry in the first database table with the digital identifiers for the at least one entry in the second database table; and
transmit a single confirmation to the client device after receiving confirmation from the database that the first and second messages were successful.

20. The computer system of claim 19 wherein the first table is a table of events and the second table is a table of contacts, and wherein the electronic request received from the client device is a request for a new event that comprises a list of contacts corresponding to event invitees, and wherein the list is represented by a string array.

* * * * *